United States Patent
Singh Warner (10) Patent No.: US 12,067,051 B1
(45) Date of Patent: Aug. 20, 2024

(54) MUSIC AND CONTENT RECOMMENDATION, IDENTIFICATION, SIMILARITY EVALUATION, AND MATCHING

(71) Applicant: Kipling Conrad Singh Warner, Vancouver (CA)

(72) Inventor: Kipling Conrad Singh Warner, Vancouver (CA)

( * ) Notice: Subject to any disclaimer, the term of this patent is extended or adjusted under 35 U.S.C. 154(b) by 0 days.

(21) Appl. No.: 17/207,458

(22) Filed: Mar. 19, 2021

Related U.S. Application Data (60) Provisional application No. 62/992,114, filed on Mar. 19, 2020.

(51) Int. Cl.
*G06F 16/683* (2019.01)
*G06F 16/632* (2019.01)
*G06F 16/638* (2019.01)
*G06F 16/68* (2019.01)

(52) U.S. Cl.
CPC .......... *G06F 16/685* (2019.01); *G06F 16/634* (2019.01); *G06F 16/639* (2019.01); *G06F 16/686* (2019.01)

(58) Field of Classification Search
None
See application file for complete search history.

(56) References Cited

U.S. PATENT DOCUMENTS

| | | | | |
|---|---|---|---|---|
| 2004/0107821 | A1* | 6/2004 | Alcalde | G10H 1/0058 84/608 |
| 2007/0282860 | A1* | 12/2007 | Athineos | G10L 25/48 |
| 2008/0154962 | A1* | 6/2008 | Yu | G11B 27/105 707/E17.02 |
| 2010/0104217 | A1* | 4/2010 | Tsurumi | H04N 21/47 382/284 |
| 2017/0344635 | A1* | 11/2017 | Koenigstein | G06F 16/68 |
| 2018/0049688 | A1* | 2/2018 | Knight | G10L 25/63 |
| 2018/0341704 | A1* | 11/2018 | Barkan | G06F 16/639 |
| 2019/0156696 | A1* | 5/2019 | Charters | G06F 16/637 |

OTHER PUBLICATIONS

Anshumali Shrivastava and Ping Li, Assymetric LSH (ALSH) for Sublinear Time Maximum Inner Product Search (MIPS), 2 Proc. Of the 27th Int'l Conf. on Neural Information Processing Systems 2321 (Dec. 2014) (Year: 2014).*

Yury A. Malkov and Dmitry .A. Yashunin, Efficient and robust approximate nearest neighbor search using Hierarchical Navigable Small World graphs, https://arxiv.org/abs/1603.09320 (last revised Aug. 14, 2018) (last accessed Nov. 28, 2023) (Year: 2018 ).*

* cited by examiner

*Primary Examiner* — Walter F Briney, III
(74) *Attorney, Agent, or Firm* — Harness, Dickey & Pierce, P.L.C.

(57) ABSTRACT

Systems, devices and methods for analyzing music and other content are provided. In some embodiments, music libraries may be searched by using one or more songs, portions of songs or other segments of music as the search key. Other types of audio and video files may also be searched using similar devices and methods. In other embodiments, a musician or vocalist who sounds similar to another musician or vocalist may be identified. Similarity scores may be generated for music and/or other content that indicate the likelihood that they will be perceived as similar or dissimilar.

18 Claims, 4 Drawing Sheets

```
// Get best embedded artwork...
pair<vector<byte>, Mime::MediaType> AudioDecoder::GetBestArtwork() const
{
    // Lambda for scoring a stream's artwork, higher being better candidate...
    const auto ScoreArtwork = [](const AVStream *Stream) -> float
    {
        // Score for artwork. Higher is better...
        float Score = 0.0f;

// There's no metadata associated with this stream. We just know it
        // contains an image for something, but not what it's for...
        if(!Stream->metadata)
        {
            // Look at the size of the image as a hint...
            Score = log10f(Stream->attached_pic.size);

// Images without image descriptive metadata would render scores of...
            //  1 KB  -> 3.010
            //  2 KB  -> 3.311
            //  3 KB  -> 3.487
            //  10 KB -> 4.010
            //  1 MB  -> 6.021
            return Score;
        }

// There is metadata associated with the image in this stream. Examine
        //  all of it for hints to better score artwork...
        for(AVDictionaryEntry *Entry = nullptr;
            Entry;
            ::av_dict_get(Stream->metadata, "", Entry, AV_DICT_IGNORE_SUFFIX))
        {
            // Obtain metadata's key and value...
            string Key   = Entry->key;
            string Value = Entry->value;

// Transform key and value into lowercase...
            transform(Key.begin(), Key.end(), Key.begin(), ::tolower);
            transform(Value.begin(), Value.end(), Value.begin(), ::tolower);

// Freeform comment or title, which may contain hints...
            if(Key == "comment"s || Key == "title"s)
            {
                // Cover is a good candidate...
                if(Value.find("cover") != string::npos)
                    Score += 25.0f;

// Front anything is good too...
                if(Value.find("front") != string::npos)
                    Score += 25.0f;

// Album next best...
                if(Value.find("album") != string::npos)
                    Score += 10.0f;
            }
        }

// Return calculated artwork score hint to comparison functor...
        return Score;
    };

// Priority queue comparison lambda for finding best artwork at the top...
    const auto ArtworkComparison = [&ScoreArtwork](
        const AVStream *Left, const AVStream *Right)
    {
        // Calculate artwork scores for both image streams and compare...
        return ScoreArtwork(Left) < ScoreArtwork(Right);
    };
```

FIG. 1A

```cpp
// Priority queue containing all artwork streams, sorted via our scoring
// lambda...
priority_queue
<
    const AVStream *,
    vector<const AVStream *>,
    decltype(ArtworkComparison)
> ArtworkPriorityQueue(ArtworkComparison);

// Inject priority queue with list of all streams containing artwork...
for(const auto CurrentStreamIndex : NumericRange(0, static_cast<signed>(m_Container.get()->nb_streams)))
{
    // Retrieve stream...
    const auto Stream = m_Container.get()->streams[CurrentStreamIndex];

// Doesn't contain an image. Skip it...
    if(!(Stream->disposition & AV_DISPOSITION_ATTACHED_PIC))
        continue;

// Stream claims to contain an image, but size is invalid. Skip it...
    if(Stream->attached_pic.size <= 0)
        continue;

// Be verbose...
    P_VERBOSE_MSG_(_("Artwork heuristic score: ") << ScoreArtwork(Stream));

// Add stream to the artwork priority queue...
    ArtworkPriorityQueue.push(Stream);
}

// We checked all streams and found no artwork...
if(ArtworkPriorityQueue.empty())
    throw ClientServiceException(
        Code::Not_Found, _("Song does not contain any artwork."));

// Select the stream with the best artwork...
const AVStream *ArtworkStream = ArtworkPriorityQueue.top();

// Retrieve the raw data to the artwork...
const AVPacket * const ArtworkPacket = &(ArtworkStream->attached_pic);

// Determine the MIME type of the artwork...

// Flag on whether result was detected properly...
    bool ResultUncertain = true;

// Pistache MIME type...
    Mime::MediaType ArtworkMimeType;

// Probe data...
    Glib::ustring MimeTypeString = Gio::content_type_guess(
        ""s, ArtworkPacket->data, ArtworkPacket->size, ResultUncertain);

// Detected...
    if(!ResultUncertain)
        ArtworkMimeType = Mime::MediaType(MimeTypeString, Mime::MediaType::DoParse);

// Otherwise if detection failed, use octet stream...
    else
        ArtworkMimeType = Mime::MediaType(
            Mime::Type::Application, Mime::Subtype::OctetStream);

// Copy the artwork packet's data into a data buffer for the caller...
vector<byte> RawArtwork(
    reinterpret_cast<byte *>(ArtworkPacket->data),
    reinterpret_cast<byte *>(ArtworkPacket->data) + ArtworkPacket->size);

// Return the raw buffer and mime type to caller by value. This should be
// efficient because of copy elision...
return make_pair(RawArtwork, ArtworkMimeType);
}
```

MUSIC AND CONTENT RECOMMENDATION, IDENTIFICATION, SIMILARITY EVALUATION, AND MATCHING

CROSS-REFERENCE TO RELATED APPLICATIONS

This application claims the benefit of U.S. Provisional Patent Application No. 62/992,114 filed Mar. 19, 2020. The text and contents of provisional patent application hereby incorporated into this application by reference as if fully set forth herein.

FIELD OF INVENTION

The present disclosure relates to the categorization of characteristics of audible and other materials. In one aspect, the inventions are capable of identifying music and/or content that is similar to other music and/or content.

DISCUSSION OF THE BACKGROUND

Humans have found entertainment, enlightenment, happiness, and community through music from the earliest days of humanity. As the number of humans has risen, so too has the number of musicians and musical works. Humans have reached the point where it is impossible, within a single human lifespan, to listen to all extant music. In fact, estimates are that approximately one thousand songs are uploaded to streaming providers every hour—or around 17 songs every second. Put another way, a human being could listen to music every minute of her life and hear only a tiny percentage of the songs that are available.

With this proliferation of content, it has become literally impossible for a human to find the songs they would most like. Even if a human can identify ten songs they love, those songs cannot be used to accurately predict other songs they would love. This is so in part because music recommendations tend to come in the form of "Jim likes Song A and Song B, so if you like Song A, and because I think you are like Jim, you'll likely like Song B." That would be a statistical based recommendation. Statistical recommendations of this sort fail to adequately account for the individual tastes of the listener. For example, a listener might love songs by Halestorm, Joan Jett, and Pretty Reckless because they like songs by strong female singers, but another person might like those songs because they are punk-adjacent. In such a situation, statistical recommendation engines fail.

In addition, it is often the case that those using music for non-personal reasons, such as adding a musical score to a movie or packaging music for use in a public place, are unable to secure intellectual property rights required for their preferred song. In such a case, even comparing using the "Jim likes Song A and Song B" mechanism will not provide a list of usable songs with similar characteristics.

In addition, there is no reliable, automated mechanism to identify works that may infringe intellectual property rights in other works. For example, Song A may utilize elements derived from Song B in violation of the copyright in Song B. This is a particularly vexing problem with "sampling" (as is the question about whether it is considered fair use under copyright law). Current technology makes it impossible to automatically scan most or all existing music looking for infringing material. Thus, for example, if the author of Song A heard an infringing song coming out of a car stereo in a car next to her, she would have no way to later search for that infringing song.

Modern computer technology is such that computers can do what humans cannot: analyze many lifetimes of music, many orders of magnitude, faster than humans. Unfortunately, while this capability has enabled primitive music fingerprinting (such as that done by Shazaam® and Spotify®), the prior art has been unable to identify music people will like, based solely on analysis of the music itself (sub-symbolic analysis). In the same vein, existing technology is incapable of understanding how humans hear music and, thus, cannot use that understanding to identify music that has specified characteristics, such as a similarity with another song.

Another failure of the prior art is the inability to identify similar sub elements of music. For example, a user may wish to hear bands or artists with a voice similar to Mick Jagger, or bands or artists with a guitar player who plays in a manner similar to Jimi Hendrix. Among other things, the inventions disclosed herein overcome those limitations.

It should be understood that the approaches described in this section are approaches that could be pursued but are not necessarily approaches that have been previously conceived or pursued. Therefore, no admission is made, nor should it be assumed, that any of the approaches described in this section qualify as prior art merely by virtue of their inclusion in this section.

Lexography

"KEY": For the purposes of this document, we use the term "key" to refer to a search key. When the context so indicates, the term may also be used to refer to the "key" in which the music is written.

SUMMARY OF THE INVENTION

The inventions (sometimes called the "system" or "engine") herein enable a non-obvious, novel way to search small, medium, large, or arbitrarily sized music libraries. In one aspect, the search is made by using one or more pieces of music itself (whether that piece is a single song or a portion of a song or some other segment of music) as the search key (sub-symbolic analysis). As a lexicographic matter, while we describe utilizing this technology as a music search engine, unless the context clearly requires otherwise, these inventions may also be used with other audio files and types.

In another aspect, the inventions described herein may also be utilized for video analysis.

It should further be understood that while analysis of a full song or portions of a full song is one aspect of the inventions, the inventions may also be applied to analysis of only some elements of a song. Existing technology, such as the Audacity® software, are capable of voice isolation. Similar techniques may be utilized to isolate other portions of the music, such as drums, guitar, bass, piano, or other elements. In one aspect, each song may be analyzed a plurality of times looking at different elements, generating, for example, analysis of the whole song, the vocals, the guitar, just the instruments, etc. In a further aspect, a musician or vocalist who sounds similar to another musician or vocalist may be identified by looking for similarities in the sounds, or by looking for a threshold number of song matches.

In another aspect, matches may be further made or refined by language analysis. In one variant, the gender, tone, tremor, or cadence of the voice may be utilized. In another, the words or language spoken may be identified (such as by voice-to-text) and used to force inclusion or exclusion of songs or as one factor among a plurality of factors analyzed. In another, the grade level of the words or word complexity may be utilized. In another, the subject matter of the words may be utilized. In another, the amount of time that the voice is out of tune or off pitch, and the amount by which it is out of tune or off pitch, may be used. In another, the use of voice autotune technology and/or the frequency of use of autotune technology may be utilized.

In one aspect, a user may start with a music library of any size. This library may be a single library owned by a single entity, amalgamated music from multiple labels, independent artists, or publishers, a personal or other music library, online music libraries, or any combination thereof.

The inventions herein further allow a user to receive, analyze and integrate a new supply of music when received. Among other things, the inventions allow users to predict which new music is more likely to generate revenue based on how existing similar music has performed financially. Furthermore, the inventions may allow users to predict other effects of the music based on effects of similar songs. For example, certain songs may be associated with certain dance styles, and identification of similar sounding songs would likely be associated with those dance styles. Similarly, certain songs may be associated with a calming effect, with certain retail establishments, with music in elevators, or other characteristics, and the inventions used to find music sufficiently similar as to be highly likely to cause similar effects.

Applications are myriad, and include such uses as a digital jukebox in bars, restaurants, and pubs where patrons are able to play more music like the music they just paid to hear. In one aspect, a user may select one or more songs, and until some event (such as the passage of time, use by another user, or otherwise), the digital jukebox will continue to play songs with a high level of similarity to the songs selected by the user. Such use is not limited to digital jukeboxes, and may be implemented on personal listening devices, Android-based devices, iOS-based devices, shared listening devices, or other listening devices. Furthermore, music streaming services such as Spotify®, Google Play®, Apple Music®, Netflix®, SiriusXM®, Amazon Music®, and others may utilize the technology to construct playlists or otherwise recommend music.

In another aspect, a user may create a "playlist" of songs based on a search key song. The inventions may then be used to substitute similar songs in the playlist and/or to supplement the playlist. Thus, for example, a user may listen to a ten-song playlist, and then the technology would play ten additional or substituted songs that each correspond to the songs in the playlist. If multiple key songs are used, the playlist can interpolate between the keys with a variable number of appropriate similar songs.

In one aspect, a user may have a music catalog management platform that publishers and labels use to track their digital assets. Using the inventions herein, customers of that user may search within their own catalogue using the user's platform.

The user may have an online digital music store and want to be able to make intelligent product recommendations to customers based on what songs they already have in their shopping cart before they check out. The inventions disclosed herein provide that capability.

The inventions may be used to augment the efficacy of live human DJs or supplant them entirely. For example, one may have a streaming music service whose DJs need inspiration for coming up with either channel based or custom curated playlists. The inventions described herein dramatically expedite creation of such playlists. Similarly, playlists provided by a customer may be used to generate full DJ sets. In another aspect, plugins are made available to manage music libraries. Indeed, even mid-performance, the inventions may be used to suggest next tracks.

In another aspect, where choreography requires music of a certain level of similarity or of a certain type, the inventions may be utilized to generate it.

One substantial benefit is the ability to better direct customers. Frequently, customers have examples in mind of what they want to buy or obtain a synchronization license for. They may ask the system "Hey, do you have anything that sounds like this for my documentary, video game, net series, or other commercial production?" The input could be an MP3 or a YouTube® video URL. Because the inventions enable searching music for similarity indicators, and in some embodiments, providing a similarity score, using the music itself as the search key, the recommendations made to the customer have a far higher likelihood of leading to a purchase and/or customer satisfaction.

Traditionally, in the absence of such technology, the way this has been done is having humans guess at similarities, incurring substantial costs, providing frequently poor matches, and requiring infeasible amounts of manual human labor which delays the business process sometimes by weeks or months. Certain shortcuts, such as using textual tags, could simplify the process while making it far less useful and accurate to a cross cultural and multilingual planet. The bottom line is that existing methods are manual and require listening to a great deal of irrelevant music in the hopes of finding the one on which the client is actually willing to spend money. An alternative, statistical analysis of playlists to determine songs that often are liked by the same person who likes certain other songs, is a similarly poor fit for the task. It should be noted that textual tags may be utilized in conjunction with the inventions, as may human listening. In one aspect, the inventions may return N songs. Only songs with the textual tag "loud" would then be selected from the list N. Similarly, the list N may be presented for human listening to identify the songs within the list that best meet the requirements.

In another aspect, a database with copyright, licensing and/or pricing data may be incorporated into the system. In this way, only songs that are in the public domain, or that are copyrighted by a certain one or more entities, or that would cost less than a set amount may be returned (and/or the returned information may be sorted by and/or labeled with such data).

In one aspect, the inventions herein work by analyzing the actual sound of each audio track provided. This is called sub-symbolic analysis. This may be accomplished, at least in part, by performing a complex digital signal processing analysis on both time and spectral domains. In one implementation, the software actually analyzes music by listening directly to the music rather than just guessing what a user wants based on what it thinks someone like the user listened to before.

The scientific research underlying the inventions combines disparate domains, such as music theory, psychology, physics, mathematics, computing science, computer engineering, software engineering, neuroscience, and biological computing.

In one aspect, the inventions may be utilized to determine a likelihood of copyright infringement. Optionally, similarity measures may be calculated utilizing portions of songs (portions determined either by splitting based on intra-song similarity, which would be useful for a song such as Queen's Bohemian Rhapsody, or by splitting based on timing, such as every 5, 10, 15, 20, 25, 30, 35, 40, 45, 50, 55, or 60 seconds). Other songs or song portions that exceed a certain matching (similarity) score are considered likely candidates for copyright infringement. Such a system may also be used to identify infringement of audio trademarks.

Another aspect of the engine is that it is frequently desirable to add music or sound of a certain qualitative nature to materials such as film, TV, documentaries, commercials, video games, etc. This is sometimes called a "synchronization license." If, for example, a filmmaker wanted to have an uplifting song with a similar feel and sound to the Beatles' "Here Comes the Sun", it would be possible to simply ask the engine for a list of songs that meet those criteria. Similarly, a data field or fields may be used to track the license status of music, and may then be used to narrow any searches. For example, the filmmaker may wish to find royalty-free songs that may be used commercially and have a similar feel to "Taxman" by the Beatles. While The Jam's "Start" is eerily similar in many aspects to "Taxman", the database may return a license fee amount or simply may exclude the song because it is not royalty-free.

In another aspect, the similarity matching may be performed by utilizing a plurality of songs or song components to generate the search key. For example, a combination of "Strawberry Fields Forever" and "Black Dog" may be used to find a song that shares the upbeat feel of Strawberry Fields Forever and the fortitude of Black Dog. In one aspect this may be accomplished by averaging the metrics. In another aspect, it may be accomplished by looking for other songs with portions that share similar metrics. If, for example, one enjoys the combination of styles in "Bohemian Rhapsody", the metrics generated by analysis of the different portions of that song may be used to search for another song with a similar set of keys associated with different portions of the song.

It should also be understood that the similarity matching engine may be used to make a song sound more similar or different when compared to another song. As a simple example, a song in the key of D may be changed to C in order to be more similar to a song in the key of C. So too may the tempo be altered, the equalization modified, or other characteristics changed. In one aspect, the key in which the song is written may be utilized as part of a search criteria key. In another aspect, the key may be ignored or simply used to weight results.

BRIEF DESCRIPTION OF THE DRAWINGS

FIGS. 1A & 1B show pseudo code for selecting the most appropriate image artwork for a corresponding stream.

DETAILED DESCRIPTION

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications, and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures and components have not been described in detail so as not to unnecessarily obscure aspects of the present invention. These conventions are intended to make this document more easily understood by those practicing or improving on the inventions, and it should be appreciated that the level of detail provided should not be interpreted as an indication as to whether such instances, methods, procedures or components are known in the art, novel, or obvious.

Figure 2:
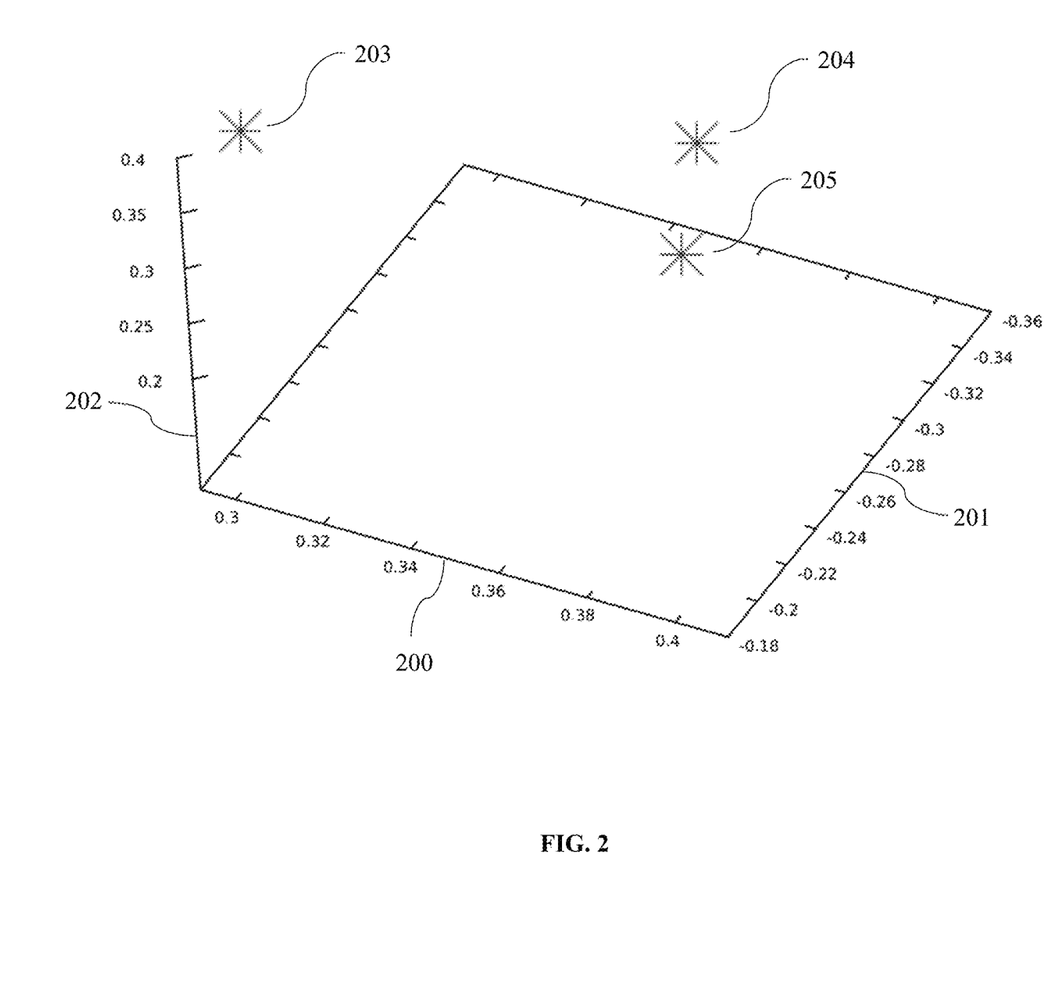
FIG. 2 is a diagram showing three songs in 3-dimensional space, with each axis representing a metric.

Turning to FIG. 2, we see placement of content within an N-dimensional space where, in this illustration, N=3. Because of the limitations of current drawing technology in showing dimensions greater than 3, we do not illustrate the presence of additional dimensions. However, the use of three dimensions is meant to be an example, and should not be interpreted as limiting.

In FIG. 2, there is an X-axis 200, a Y-axis 201 and a Z-axis 202. Each of the axes 200, 201 and 202 represent a metric (e.g., gender of vocalist, tone, cadence, etc.) on which songs will be evaluated. We see a first song 203 is relatively distant from a second song 204 and a third song 205. When seeking songs that are similar, the relative proximity of the second and third songs 204 and 205 indicates that they have a higher level of similarity than either of those songs bears to the first song 203.

Figure 3:
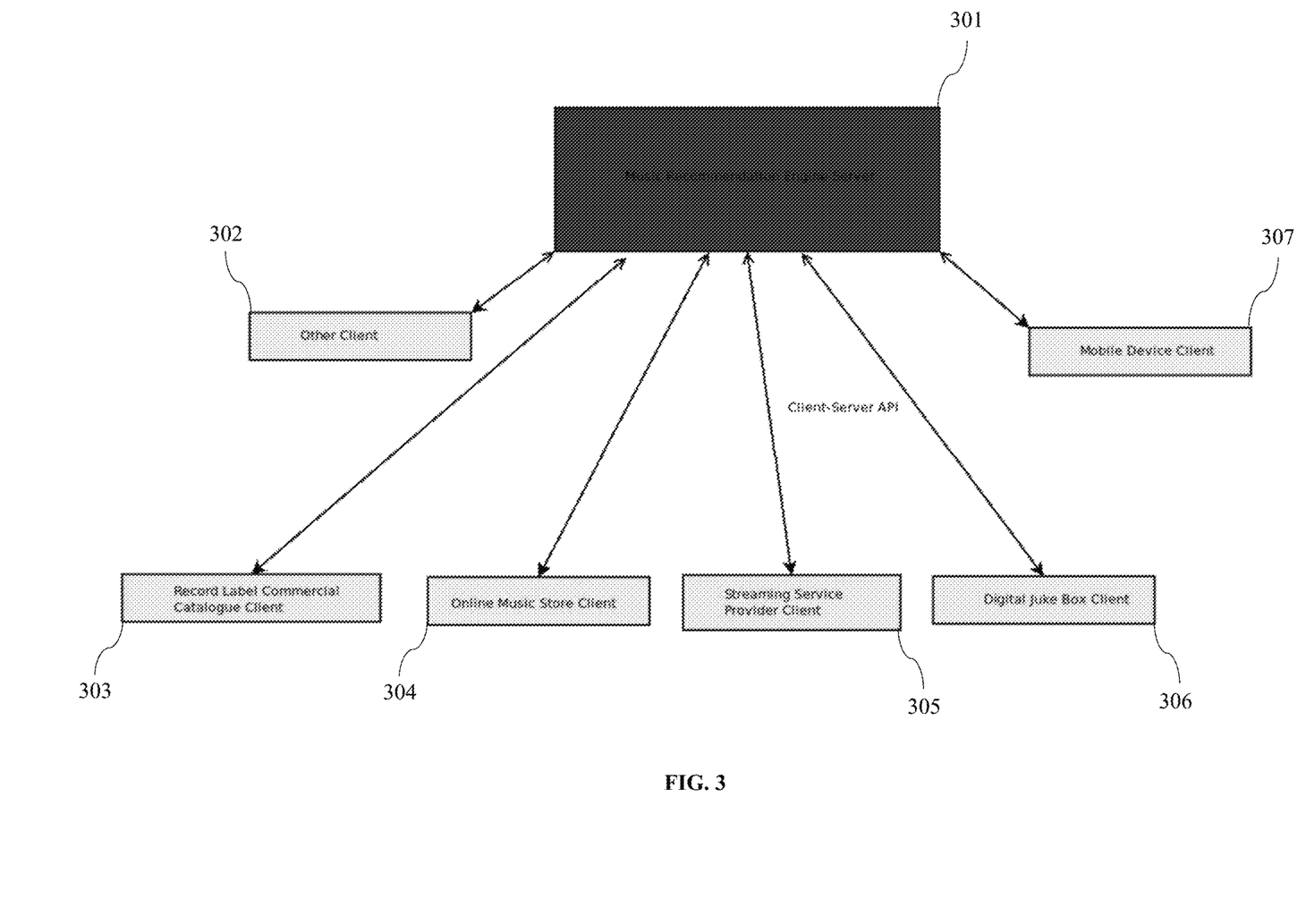
FIG. 3 is an exemplary implementation of one aspect of the inventions in a block diagram.

Turning to FIG. 3, we show a flow diagram of one aspect of the inventions. A music recommendation engine server ("MRES") 301 is operably connected to one or more of a variety of clients, including a mobile device client 307, a digital juke box client 306, a streaming service provider client 305, an online music store client 304, a record label commercial catalog client 303, or a client of another type 302. In some instances, an application programming (API) interface is utilized.

A client-server architecture may be utilized with the server exporting an API. The server can be hosted on premise or any other location a person desires. Flexibility in server location allows a person to limit transmission of any portion of their music to their local network or other infrastructure and to have all computations performed at a location of their choosing. This can reduce risk as well as the cost of insurance for a third-party's hosting environment. The API may be available via Representational State Transfer (REST) architecture, interprocess communication, dynamic or static linkage, or other means.

The described systems and processes merely exemplify various embodiments of enhanced features. The present technology is not limited by these examples.

Acoustic Analysis:

The analysis of an audio signal includes its time and spectral domains. This process extracts a set of quantifiable metrics which may include one or more beats per minute and feature vectors through mathematical and/or digital signal processing.

The process begins with the source audio samples, such as 96 KHz 5.1 surround sound, resampled to 44.1 kHz single channel, single precision, floating point samples. This ensures there is no bias based on the input format if all processing is performed on a uniform format.

A sliding signal window queue of two steps of 512 samples each, totaling 1024 samples, is loaded from the decoded audio. Each time the queue is updated after analysis, the oldest step is discarded, the newer step shifted into its place, and the latest decoded samples inserted into the queue. The queue is processed before it is updated again.

The sliding signal window has time and spectral domain features extracted. Each time this is done, a new window feature block is created containing the values of the extracted features. Every 150 window feature blocks (approximately 3.48 seconds of audio), statistical analysis is performed over the list to generate a block feature containing statistics summarizing how the time or spectral features behaved for that period of time.

The newly calculated block feature is added to a block list. After all samples from the source have been processed, every window is processed again to generate a single block feature for the entire song. This ensures there is a single song level block feature that summarizes the entire song's average timbre, along with a list of block features for every 3.48 second segment of the song. Both the song level block feature and the list of block features are later used during similarity matching.

After song and block level features have been generated, min-max scaling is performed to normalize the features to protect from bias.

In one implementation, the processing is performed on each song added to the catalogue in a single pass with optimizations for parallel execution across multi-core heterogeneous computing units. It should be understood that multiple passes may be used, some or all actions performed in sequence or serial, one or more single-core devices may be utilized, and the one or more computing units may be homogeneous in whole or part. Furthermore, it should be understood that some or all of the computing may be accomplished utilizing a quantum computer, a multi-core graphics card, field-programmable gate array, physics processing unit, a single-core graphics card, or other computing technology.

One or more feature vectors each containing K features are generated for each song or portions thereof. The vector can be conceptualized, before further algorithmic optimizations (e.g., to compress dimensionality), as a Cartesian coordinate within a K-dimensional space. Similar songs are therefore identified by spatial proximity. The foregoing implementation should not be viewed as limiting, as the inventions may be conceptualized using other modes for determination of the level of matching.

The analyzed and/or extracted features may include one or more signal descriptors for the number of times a signal changes sign, also known as the zero crossing rate; how well the signal matches a time-shifted version of itself, also known as the first order autocorrelation or noisiness; and a linear measure of the total amplitude in the signal window, also known as the energy or loudness.

It should be understood that the extracted features may be incorporated into metadata or textual data associated with a song. In this way, for example, a song with a rapid beat may have the textual data "fast" associated with it, allowing other software to search for the textual data without having to further utilize the inventions. In one aspect, saving such data may function to separate the search function from the analysis function.

Additionally frequency domain descriptors may include the line of best fit to find a gradient β of a ratio of high frequency to low frequency components of the signal, also known as the timbre or linear regression; the center of gravity representing average frequency weighted by amplitude which identifies where most of the energy of the signal lies, also known as the spectral centroid; the measure of change in spectrum over time, also known as the spectral smoothness; a measure of how much the signal changes around the spectral centroid, also known as the spectral spread; and a measure of how skewed the spectrum is about the spectral centroid, also known as the spectral dissymmetry.

Each feature may have its statistical mean, variance, skewness, and kurtosis computed across the entire audio stream. These values are stored within block features.

In one implementation, this analysis is limited to only the extent necessary as dictated by the application for which the analysis will be utilized. These features, or audio characteristics, are stored in a database. The database forms a component of the system with the system being able to query it later to obtain a ranked (sorted) listing of songs similar to that used as the audio search key. The search key may already be a song within the database or a song from an external source, such as an MP3, YouTube®, BandCamp®, SoundCloud®, or another online platform. The ranked listing can be used for any number of different use cases as described elsewhere in this document.

In order to perform this query, in one implementation the search key may be compared against every other song within the database to be considered at a time no later than the system's need to generate the ranked similarity listing. If desirable for timing or other reasons, less than all songs may be analyzed. When we refer herein to using a song as a search key, we refer to using the quantifiable metrics of the song to generate a search key.

Scalability:

Consider a design in which every possible similarity value for every ordered song pair p was pre-calculated by the function:

$$f:\{p|p\in S\times S\}\rightarrow\{m|0\leq m\leq 1 \char`\^ m\in R\}$$

The function takes a song pair p and maps it to a real number m in the closed interval [0, 1]. The semantics we define arbitrarily as 1.0 to mean the two songs are identical, numerical values between 0.0 and 1.0 to mean a percentage of similarity (e.g., 0.25 to mean they are 25% similar, 0.6 to mean they are 60% similar, 0.72 to mean they are 72% similar, etc.) and 0.0 to mean they have no discernable similarity at all. Such a table in the system's $|S|^2$ database would require storage cells to compare every song against every other.

In such a design the table would contain the pre-computed similarity value between every single pair of songs. To perform a similarity match, one would begin by selecting an arbitrary song as the desired search key as identified by its unique row within the table. The adjacent cells along the song's row would collectively contain the similarity values between that song as the search key and every other song in the database. To compute a ranked listing one need only generate a sorted list of the row's cells. This operation can be performed with an upper bound of $O(n \log_2 n)$ time complexity for a catalogue of n songs.

But while linear logarithmic time complexity may be reasonable with large catalogues, the space complexity may make a more efficient data storage and analysis a desirable goal. A music catalogue of 79,000,000 songs would still require space complexity—or exactly 6,241,000,000,000,000 cells.

While using a database of such a size is generally impractical and economically inefficient with current technology, it should be appreciated that quantum computing, biological computing, and other breakthrough technologies may render such a database practical. This would allow linear or sub-linear time complexity for similarity matches. Furthermore, even without such exotic technologies, catalogues could be reduced in size to achieve practicality of this technique. Of course reducing the catalogue to assist with database management comes at the cost of pruning potentially relevant matches.

If we put aside more sophisticated fundamental storage types for cells, like double or quad-precision floating points, and restrict ourselves to a single byte width to store an integral value, the number of bytes required would still be 6,241,000,000,000,000 (6.241 petabytes) for a catalogue of 79,000,000 songs. This is not efficient. One must consider optimization strategies if large catalogues could ever be accommodated with a pre-computed similarity table at all.

Recall that because a song's similarity to any other is equivalent to the inverse. A pre-computed similarity match table would therefore always mirror itself across the diagonal. The table could be reduced by a factor of one half since the extant half could always predict any "missing" cell in the other half in O(1) time. But this space optimization comes only as a constant factor saving that brings limited benefit as a catalogue scales. Consider that an extremely large number reduced in half is still an extremely large number.

If all possible similarity queries that used internal songs as their search key were not pre-computed, but only a subset were, we would effectively be proposing a cache. The cache could map search keys to pre-computed ranked listings. As the cache increased in size, the number of cache misses would be inversely proportional. That is to say that the larger the cache, the less new work that will need to be done with each query because it will be more likely that the work will already have been performed. But while the benefit derived is linear, the cost would remain quadratic. To illustrate, if $C_{size}$ is the storage required by a cache of N cached entries, with C being some constant factor, such as the size of a single cache cell, then $C_{size}$ would be determined as:

$$C_{size}(N)=cN^2$$

Since the system could receive a search key of any song within the database at any time, each has an equal probability of selection. There is therefore no reliable means of predicting when or which song the user will select next as the search key. In other words, if the user searched using Song A the system could not know that the next would be with Song B.

This is important to consider in the design of any cache. It implies a uniform random access pattern. This is the worst case scenario in the design of any cache where the designer aims for a high hit ratio.

For this reason in certain implementations, in one aspect our system would not use the above described technique and/or may not rely on a fully pre-computed similarity table of a K-dimensional space to handle large music catalogs. The system may instead use advanced optimizations, algorithms and storage techniques, to prune the search space. These include MinMaxHeaps, directed or undirected graphs, and locality hashing in multidimensional spaces to achieve dimensional compression. This ensures that the time and space complexities necessary to complete a query are practical, regardless of the size of the music catalogue.

The quality of returned similarity matches can be improved over time through progressive calibration of the system. The system can be trained based on user input with the assistance of a genetic algorithm or other means. This can be performed, in part, by changing the value of weights to scale feature values. For example, a weight of unity leaves a feature as is. A weight of 0.5 reduces its significance by half. These are just examples and weights can be changed by any amount between 0.01 and 1.0. Training the system amounts to finding optimal weights.

Artwork Automated Selection & Extraction:

During audio analysis, embedded non-digital signal processing metadata, such as artist name, title, album, and related may be extracted from the audio container or stream and stored within an appropriate database. This information is associated with each song admitted into the catalogue and may be useful for users who wish to perform queries that benefit from knowing additional descriptive information about the music in the database. In one aspect, performing a similarity match should always provide in the ranked listing each song's artist and title, as opposed to a potentially non-descriptive file name or merely some kind of unique database identifier.

The system, if requested, can also provide a user with an appropriate piece of image artwork for any song that has embedded one within its binary stream when admitted into the system's catalogue. But the challenge is in determining how the system should select the best image in situations where the binary stream contains many.

In one aspect, an additional data point or data points may be derived from image analysis. For example, a full image of the band would reveal how many members there are, and would be useful in a search such as one for solo artists.

Why would a user request artwork? Consider the scenario where they have an online music store that is powered by the system in its backend. The songs listed on the website and their associated information are all pulled from within the system's database and various recommendations are made from time to time to the user's customers based on what is already in their shopping cart.

In one aspect, images may be introduced in a cloud-style presentation, where images associated with songs that are proximate on similarity markers, enabling a more flexible method for presenting information about similar songs. In one implementation, the proximity of songs in K-dimensional space may be measured and used to construct a cloud in 2 or 3 dimensional space to visually present a user with similar songs from which to further proceed with their desired use.

The user queries the system to generate a browser rendered catalogue with each song ideally, for certain use cases, having a single piece of artwork to display as a thumbnail somewhere appropriate on the website. In other use cases, multiple images may be utilized for one or more songs. In most cases, the user needs only one image per song, and ideally the best one. In some implementations, the system would be better off providing the album cover, as opposed to the inside of the jewel case, the back cover, or a photograph of the vinyl or optical media itself, though other implementations may utilize those other image sources or image sources not referenced above.

Many audio files in the wild contain image data, but without proper metadata descriptors identifying which image is the album cover. Further, audio files in the wild can be encoded in any number of different codecs, such as Free Lossless Audio Codec (FLAC), Vorbis, MP3; and, in turn, stored within any number of different kinds of containers such as Ogg, MPEG, and so forth. Within a file container there could be any number of different streams. A stream could represent compressed audio, video, subtitles, images, or other data. In the case of image data, it frequently has no useful associated semantic hints.

In a preferred implementation, the system uses a simple, but intelligent algorithm that has worked exceptionally well during field testing to select the most appropriate image artwork. It works by computing a heuristic score for each stream of non-zero size that purportedly contains an image. It injects that stream's ordinal as placed within its parent container into a priority queue. The priority queue is sorted on each injection with a lambda functor that computes scores based on the quality of the image within the image stream. Retrieving the first element after traversing all candidate streams will select the stream with the highest (best) score. FIGS. 1A and 1B show pseudo code for this intelligent algorithm.

The heuristic begins by initializing an image stream's score to zero. If the stream does not contain any descriptive metadata to describe the artwork, it is first set to the base ten logarithm of the size of the stream. Artwork that is one kilobyte in size would therefore score 3.010, two kilobytes at 3.311, three kilobytes at 3.487, ten kilobytes at 4.010, one megabyte at 6.021, and so forth. This ensures that the best artwork, even without any other descriptive hints, still has a chance of being discovered.

Next the stream's score is potentially increased further if it contains an appropriate freeform textual tag, such as "cover", "front", or "album". Empirical research has demonstrated this to be common in the wild.

At this stage the most appropriate image artwork is almost always at the head of the priority queue. Once selected the stream's payload is probed to determine the MIME type, such as JPEG or PNG, so the user will know how to decode the binary data. The data and MIME type are then returned to the user for rendering in whatever manner may be appropriate for their use case.

System Architecture:

A unique characteristic of the system is the architecture. Users have control over where the system's music recommendation engine server is hosted. They are not confined to using a single central provider, but may host wherever it is that is most convenient for the user. This is essential because it is not unusual for music labels and other music related businesses to prohibit their music from leaving their local network for legal reasons. Our system's architectural design circumvents this or similar restrictions by allowing the user to perform all music analysis directly "on site" or wherever is practical for them.

In some embodiments, the system may be divided into a primary server, database backend, client utilities, license server, documentation, and a default configuration.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A system, comprising:
one or more processors;
one or more computer-readable media storing computer-executable instructions that, when executed on the one or more processors, cause the one or more processors to perform acts comprising:
generating a song block feature for each song in a plurality of songs, including;
extracting time and spectral domain features via a sliding signal windows, including a spectral centroid, a spectral smoothness, a spectral spread, and a spectral dissymmetry,
generating a plurality of window features from the extracted time and spectral domain features, each window feature including a mean, variance, skewness, and kurtosis,
generating a plurality of block features from the plurality of window features, and
maintaining a list of block features for each song in the plurality of songs;
normalizing the song block feature;
receiving a request comprising a search key; and
determining one or more results based on a proximity of the search key to the plurality of songs.

2. The system of claim 1, wherein each block feature is generated from a set of 150 window features.

3. The system of claim 1, wherein normalizing the song block feature further comprises normalizing the plurality of block features.

4. The system of claim 1, wherein the spectral domain features further comprise one or more of:
a zero crossing rate;
a first order autocorrelation;
an energy level; and
a linear regression.

5. The system of claim 4, further comprising:
generating textual song metadata from the time and spectral domain features.

6. The system of claim 1, wherein the search key is the identity of a song.

7. The system of claim 1, wherein the search key is music.

8. The system of claim 1, wherein receiving a request comprising a search key further comprises a second search key and determining the one or more results comprises averaging one or more time and spectral domain features of each search key.

9. The system of claim 1, further comprising:
selecting an embedded artwork for a song based on a heuristic score.

10. A method comprising:
generating a song block feature for each song in a plurality of songs, including:
extracting time and spectral domain features via a sliding signal window, including a spectral centroid, a spectral smoothness, a spectral spread, and a spectral dissymmetry,
generating a plurality of window features from the extracted time and spectral domain features, each window feature including a mean, variance, skewness, and kurtosis,
generating a plurality of block features from the plurality of window features, and
maintaining a list of block features for each song in the plurality of songs;
normalizing the song block feature;
receiving a request comprising a search key; and
determining one or more results based on a proximity of the search key to the plurality of songs.

11. The method of claim 10, wherein each block feature is generated from a set of 150 window features.

12. The method of claim 10, wherein normalizing the song block feature further comprises normalizing the plurality of block features.

13. The method of claim 10, wherein the time and spectral domain features further comprise one or more of:
   a zero crossing rate;
   a first order autocorrelation;
   an energy level; and
   a linear regression.

14. The method of claim 13, further comprising:
   generating textual song metadata from the time and spectral domain features.

15. The method of claim 10, wherein the search key is the identity of a song.

16. The method of claim 10, wherein the search key is music.

17. The system of claim 10, wherein receiving a request comprising a search key further comprises a second search key and determining the one or more results comprises averaging time and spectral domain features of each search key.

18. The system of claim 10, further comprising:
   selecting an embedded artwork for a song based on a heuristic score.

* * * * *